H. KRAFT.
HEATER.
APPLICATION FILED OCT. 10, 1918.
1,371,693.  Patented Mar. 15, 1921.
3 SHEETS—SHEET 3.
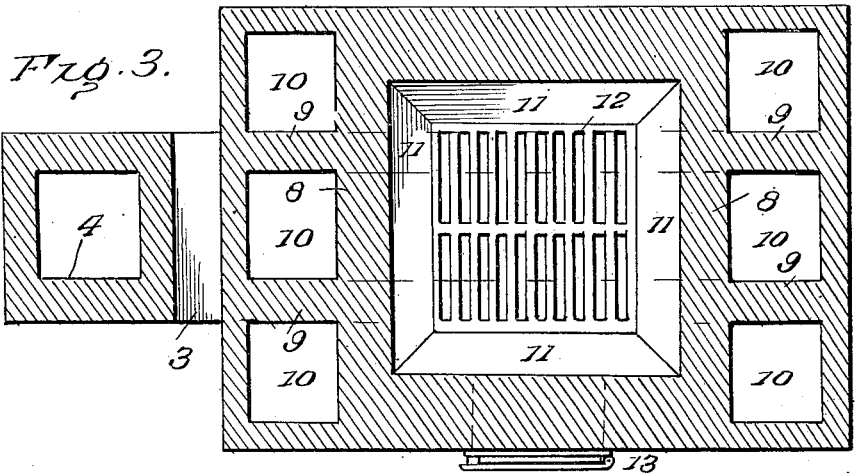
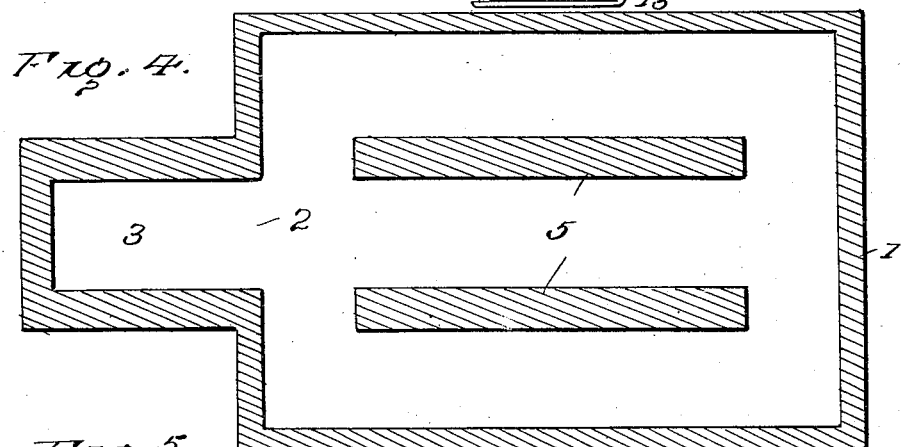
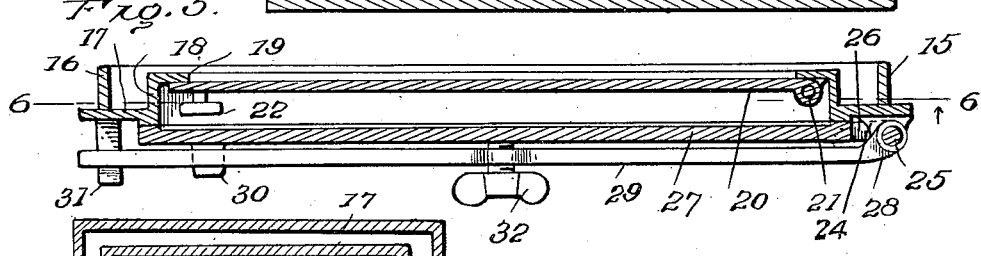
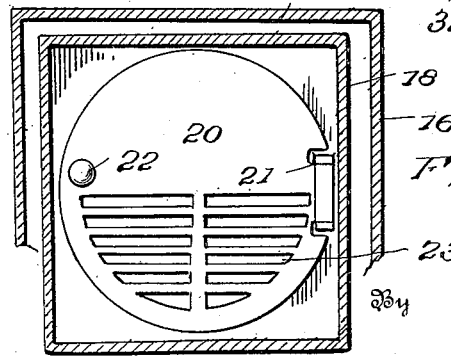
Inventor
Harry Kraft
By Lacey & Lacey Attorneys

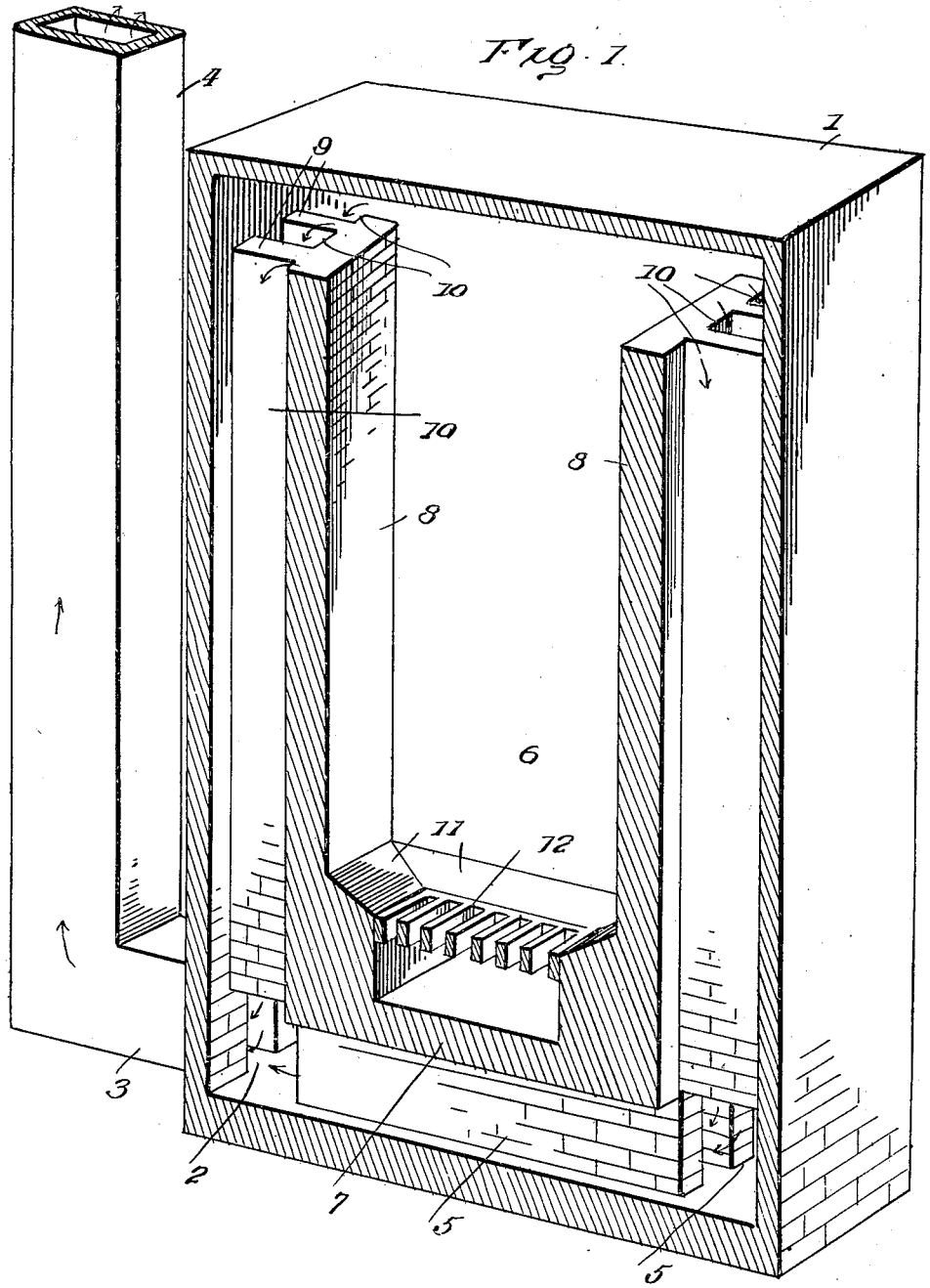

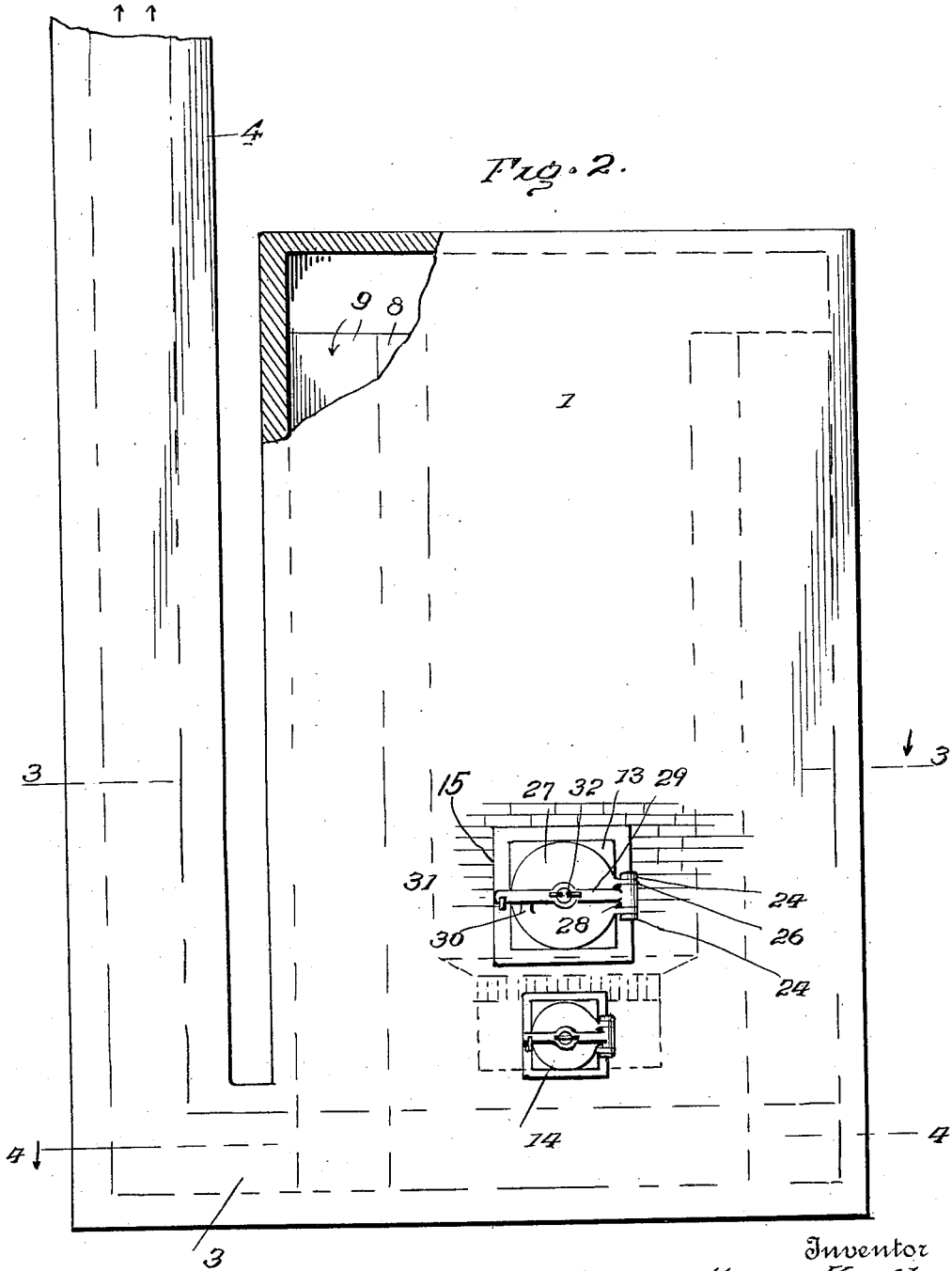

UNITED STATES PATENT OFFICE.

HARRY KRAFT, OF NASHVILLE, TENNESSEE.

HEATER.

1,371,693. Specification of Letters Patent. Patented Mar. 15, 1921.

Application filed October 10, 1918. Serial No. 257,585.

*To all whom it may concern:*

Be it known that I, HARRY KRAFT, a citizen of the United States, residing at Nashville, in the county of Davidson and State of Tennessee, have invented certain new and useful Improvements in Heaters, of which the following is a specification.

My invention relates to means for heating buildings and has for its object the provision of a heater which will utilize all the heat units of the fuel.

The invention is illustrated in the accompanying drawings and will be hereinafter fully described, the novel features being particularly pointed out in the claims following the description.

In the drawings—

Figure 1 is a perspective sectional view of a heater embodying my invention;

Fig. 2 is a front elevation of the same;

Fig. 3 is a horizontal section on the line 3—3 of Fig. 2;

Fig. 4 is a horizontal section on the line 4—4 of Fig. 2;

Fig. 5 is a horizontal section through one of the doors;

Fig. 6 is a section taken on the line 6—6 of Fig. 5.

In carrying out my invention, I employ a casing 1 of any suitable material which is preferably of considerable height relative to its horizontal dimensions. In one wall of the casing at the bottom thereof, I provide an outlet opening 2 which leads into a short horizontal flue 3 which opens directly into the outlet flue or chimney 4, as shown in Figs. 1 and 2. At the bottom of the casing 1, I erect partitions 5 which will preferably be of refractory material and terminate short of the sides of the casing. These partitions are preferably so spaced as to provide equal passages between themselves and between each partition and the adjacent wall of the casing. The partitions 5 are utilized to support the fire box 6 which, as illustrated in Fig. 1, comprises a bottom 7 and spaced parallel vertically arranged side walls 8 which terminate at their upper ends below the top of the casing. The side walls 8 of the fire box are spaced from the side walls of the casing by a plurality of vertically arranged spaced parallel partitions 9 which form vertical flues 10. The flues 10 on opposite sides of the fire box establish communication between the fire box and the outlet passage 2 which in turn has communication with the chimney 4. The flues 10 farthest away from the outlet passage or opening 2 are in communication with the opening 2 by means of passages formed between the partitions 5 and the front and rear walls of the casing. With reference to Fig. 3 it will be observed that the front and rear walls of the casing form the front and rear walls of the fire box since the side walls 8 of the fire box are joined with the front and rear walls of the casing. The flues 10 at their lower ends communicate directly with the spaces around the partitions 5 and through said spaces with the outlet flue 3. Buttresses 11 are formed at the lower ends of the inner walls 8 and of the front and rear walls of the casing to furnish supports for grate bars 12.

Doors 13 and 14 are provided to permit access to the fire box and the ash pit, respectively, and these doors are of duplicate construction although the door to the ash pit need not be as large as the door to the fire box. The doors comprise a frame 15 which is set into the front wall of the casing and has a rim or rib 16 which sets in the front wall of the casing and is intended to be firmly secured in the wall. This rim or rib 16 is formed on the inner face of a frame plate 17 which bears against the outer face of the front wall of the casing and is provided at its inner edge with an inwardly extending rim or flange 18 having a lip 19 at its inner edge. An inner door plate 20 is hinged, as at 21, upon the lip 19, and, at a point diametrically opposite its hinge, this door is provided with a knob or handle 22 whereby it may be easily opened when it is desired to supply fuel to the heater. The lower portion of this door 20 is constructed with a plurality of slots or other openings 23 whereby the draft may be regulated. Upon the outer side of the frame 15 I form lugs or ears 24 to receive a pin or pintle 25 which is pivotally engaged by hinge lugs or ears 26 on the outer door plate 27 and also by an eye 28 at the end of a locking bar 29. A supporting lug 30 is provided on the outer face of the door plate 27 to support the locking bar 29 and a keeper lug 31 is formed on the door frame to be engaged by and retain the free end of the locking bar. A thumb screw 32 is mounted centrally in the locking bar and bears at its inner end against the outer face of the door plate 27 so that when the screw is properly manipulated the door will be hermetically sealed against the door frame. The eye 28 of the locking bar is somewhat shorter than the distance between the lugs or ears 26 on the door plate and fits loosely upon the pintle so that it may rock vertically to an extent sufficient to permit it to clear the keeper lug 31 in the opening or closing movement of the door.

In the use of my improved heater the fuel is placed in the fire box through the door 13 in any convenient manner and the door 13 is closed while the door 14 to the ash pit is opened. The fuel being ignited, the door to the ash pit is left open until all the volatile matter has passed off and combustion thoroughly established, it being obvious that the products of combustion will rise to the upper ends of the inner walls 8 and then pass over said walls into the flues 10 and down the same to the bottom of the heater whence they will flow below the ash pit into and through the outlet flue 3 and thence into the escape flue or chimney 4. After combustion has been thoroughly established, the door to the ash pit is closed and the screws 32 on both doors turned home, the first action of the said screws being to move the locking bars outwardly against the upwardly projecting terminals of the keeper lugs 31 after which the screws will act to force the outer door plates into binding engagement with the door frames so that the door openings will be effectually sealed and access of air to the fire box, consequently, cut off. The fuel will then char and continue to give off heat for a long period and this heat, being unable to escape through the front of the furnace, will heat the walls thereof thoroughly and after permeating the walls will radiate therefrom throughout the building. Inasmuch as the inflow of air to the fire box is cut off when the doors are closed, there is no draft through the heater and, consequently, the heated products will be retained in the heater instead of being carried off into the chimney and lost. If it be desired to have a slow draft through the furnace and a high temperature is to be avoided, the upper door plate 27 is swung outwardly to an open position and air may then pass into the fire box above the fuel through the slots or openings 23 in the inner door plate 20. It will be noted that the products of combustion are permitted to reach the chimney only by circulating tortuously through the heater and, consequently, will be retained within the heater for a considerable period so that by the time they reach the chimney all the heat units will have been extracted therefrom, the result being a great economy of fuel and efficient heating without a forced draft. My heater is intended primarily to be built in the partition wall between two or more rooms so that it will radiate heat directly into the rooms.

Having thus described the invention, what is claimed as new is:

1. A heater comprising a casing having side walls and front and rear walls connecting the side walls, a fire box arranged within the casing and having vertically arranged side walls arranged in spaced relation to the side walls of the casing and joined with the front and rear walls of the same, thereby forming vertically arranged flues on opposite sides of the fire box, the side walls of said fire box terminating below the upper end of the casing for establishing communication between said fire box and the upper ends of said flues, and a chimney having communication with said flues at the lower ends of the same.

2. A heater comprising a casing having vertical side walls and front and rear walls connected by the side walls, a fire box arranged within the casing and having vertical side walls arranged inwardly of the side walls of the casing, a plurality of vertically arranged partitions disposed between the side walls of said fire box and the side walls of said casing thereby forming a plurality of vertically arranged flues on opposite sides of said fire box, the upper ends of the side walls of said fire box terminating below the upper ends of the casing, thereby establishing communication between said fire box and said flues, an outlet member having communication with the flues at the lower ends of the same, and a plurality of spaced supporting partitions disposed beneath said fire box and establishing communication between one of said flues and said outlet member.

3. A heater comprising a casing having front, rear and side walls, a fire box disposed within the casing and having vertical side walls arranged inwardly of the side walls of the casing and joined with the front and rear walls of the casing, a plurality of vertically arranged spaced parallel partitions arranged between the side walls of said fire box and the side walls of said casing for forming a plurality of flues on opposite sides of the fire box, said partitions and the side walls of said fire box terminating below the upper end of the casing for establishing communication between said fire box and said flues, said casing being provided with an outlet at its lower end having communication with said flues at the lower ends of the same, means to support said fire box in spaced relation to the bottom of said casing, the front and rear walls of said casing and the side walls of said fire box being provided with inwardly extending buttresses, and a grate supported by said buttresses.

In testimony whereof I affix my signature.

HARRY KRAFT. [L. S.]